United States Patent
Wolgast et al.

(10) Patent No.: US 9,283,897 B2
(45) Date of Patent: Mar. 15, 2016

(54) SEAT WITH UNIVERSAL DEVICE FOR RECEIVING AN ELECTRONIC GADGET FOR AN AIRCRAFT OR SPACECRAFT

(71) Applicant: AIRBUS OPERATIONS GMBH, Hamburg (DE)

(72) Inventors: Carsten Wolgast, Adendorf (DE); Thorsten Koehn, Tornesch (DE); Gerd Dueser, Jork (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/222,184

(22) Filed: Mar. 21, 2014

(65) Prior Publication Data

US 2014/0284973 A1    Sep. 25, 2014

Related U.S. Application Data

(63) Continuation of application No. PCT/EP2012/069197, filed on Sep. 28, 2012.

(60) Provisional application No. 61/540,273, filed on Sep. 28, 2011.

(30) Foreign Application Priority Data

Sep. 28, 2011 (DE) .......................... 10 2011 083 622

(51) Int. Cl.
*B64D 11/00* (2006.01)
*B60R 7/04* (2006.01)
(Continued)

(52) U.S. Cl.
CPC . *B60R 7/043* (2013.01); *A47C 7/72* (2013.01); *B60N 2/4876* (2013.01); *B64D 11/0015* (2013.01); *B64D 11/06* (2013.01); *B64D 11/0624* (2014.12); *B60R 2011/0017* (2013.01)

(58) Field of Classification Search
CPC .......... A47C 7/62; A47C 7/72; B60N 2/4876; B64D 11/0015; B64D 11/06; B60R 11/0235; B60R 2011/0017; B60R 7/043
USPC ............... 297/188.01, 188.2, 188.21, 188.04, 297/217.3; 244/118.5, 118.6; 348/837
See application file for complete search history.

(56) References Cited

U.S. PATENT DOCUMENTS 5,529,265 A * 6/1996 Sakurai .............. B64D 11/0015
                                                          244/118.5
6,370,037 B1 * 4/2002 Schoenfish .......... H05K 5/0204
                                                          174/542
(Continued)

FOREIGN PATENT DOCUMENTS

DE              197 05 754 A1    8/1998
DE        10 2006 007 284 A1    8/2007
(Continued)

OTHER PUBLICATIONS

German Office Action for Application No. 10 2011 083 626.8 dated Aug. 9, 2012.
(Continued)

*Primary Examiner* — Ryan Kwiecinski
(74) *Attorney, Agent, or Firm* — Jenkins, Wilson, Taylor & Hunt, P.A.

(57) ABSTRACT

The present disclosure pertains to a seat for an aircraft or spacecraft, including a receiving device which is integrated inside the seat and is configured to receive, in an exchangeable manner, an electronic gadget fitted with a screen, and including a safety screen which is arranged in the seat such that the screen is inaccessible from outside but is visible through the safety screen, wherein the receiving device is configured to receive an electronic gadget in the form of a tablet PC or a PDA. The present disclosure furthermore pertains to a corresponding aircraft or spacecraft.

12 Claims, 4 Drawing Sheets

(51) Int. Cl.
  *A47C 7/72* (2006.01)
  *B64D 11/06* (2006.01)
  *B60N 2/48* (2006.01)
  *B60R 11/00* (2006.01)

(56) References Cited

U.S. PATENT DOCUMENTS

| | | | |
|---|---|---|---|
| 6,669,285 B1 * | 12/2003 | Park | B60N 2/4876 297/217.3 |
| 6,905,167 B2 * | 6/2005 | Jost | B60N 2/4876 297/188.04 |
| 7,597,393 B1 * | 10/2009 | Tuccinardi | B60R 11/0211 297/188.04 |
| 8,711,291 B2 * | 4/2014 | Kim | H04N 5/64 348/836 |
| 2003/0226148 A1 | 12/2003 | Ferguson | |
| 2004/0032543 A1 * | 2/2004 | Chang | B60R 11/0235 348/837 |
| 2004/0144817 A1 | 7/2004 | Albert et al. | |
| 2004/0145684 A1 | 7/2004 | Albert et al. | |
| 2004/0182485 A1 | 9/2004 | Gomes | |
| 2005/0132407 A1 | 6/2005 | Boyer, Jr. et al. | |
| 2005/0204596 A1 * | 9/2005 | Peng | G09F 21/04 40/320 |
| 2005/0206206 A1 * | 9/2005 | Peng | B60R 11/0235 297/217.3 |
| 2006/0033366 A1 | 2/2006 | Jeffrey | |
| 2006/0208020 A1 | 9/2006 | Albert et al. | |
| 2007/0222248 A1 * | 9/2007 | Maulden | B60N 2/4876 296/37.15 |
| 2008/0157574 A1 * | 7/2008 | LaRussa | B60N 2/4876 297/217.3 |
| 2008/0170165 A1 * | 7/2008 | Lee | B60R 11/0211 348/837 |
| 2008/0252798 A1 * | 10/2008 | Vitito | B60K 35/00 348/837 |
| 2010/0007805 A1 * | 1/2010 | Vitito | B60K 35/00 348/837 |
| 2011/0174926 A1 | 7/2011 | Margis et al. | |
| 2011/0278885 A1 * | 11/2011 | Procter | B60R 11/0235 297/135 |
| 2012/0139303 A1 * | 6/2012 | Westerink et al. | 297/163 |
| 2012/0212012 A1 * | 8/2012 | Berger | B64D 11/0015 297/163 |
| 2013/0119727 A1 * | 5/2013 | Lavelle | B60N 2/4876 297/217.3 |
| 2013/0242523 A1 * | 9/2013 | Wallace | B60R 11/0235 361/807 |
| 2013/0292975 A1 * | 11/2013 | Yu | A47D 15/00 297/188.01 |
| 2014/0284972 A1 | 9/2014 | Riedel et al. | |
| 2014/0361569 A1 * | 12/2014 | Crepaldi | B60R 11/0235 296/37.12 |
| 2015/0034687 A1 * | 2/2015 | Terleski | B64D 11/0015 224/275 |

FOREIGN PATENT DOCUMENTS

| | | |
|---|---|---|
| DE | 10 2011 083 626 A1 | 3/2013 |
| WO | WO 01/96150 A1 | 12/2001 |
| WO | WO 02/073574 A1 | 9/2002 |
| WO | WO 03/106261 A1 | 12/2003 |
| WO | WO 2007/109703 A2 | 9/2007 |
| WO | PCT/EP2012/069202 | 4/2013 |

OTHER PUBLICATIONS

German Office Action for Application No. 10 2011 083 622.5 dated Aug. 14, 2012.
International Search Report for Application No. PCT/EP2012/069202 dated Dec. 21, 2012.

* cited by examiner

FIG. 2
FIG. 3
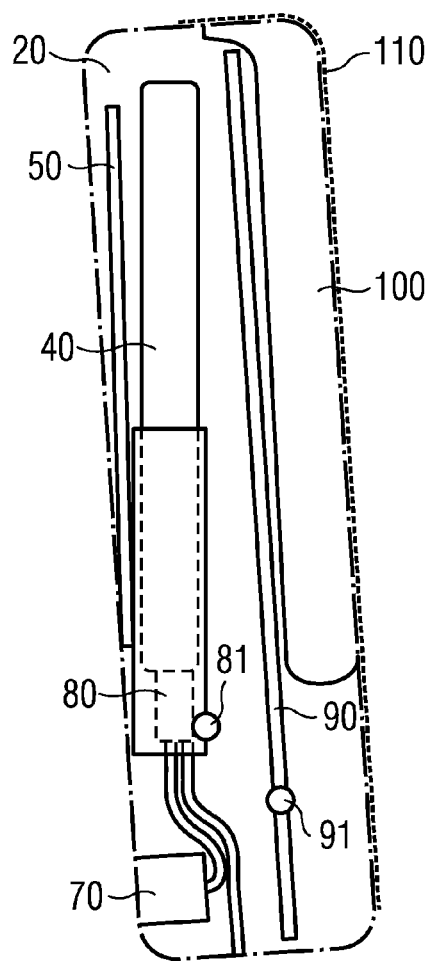
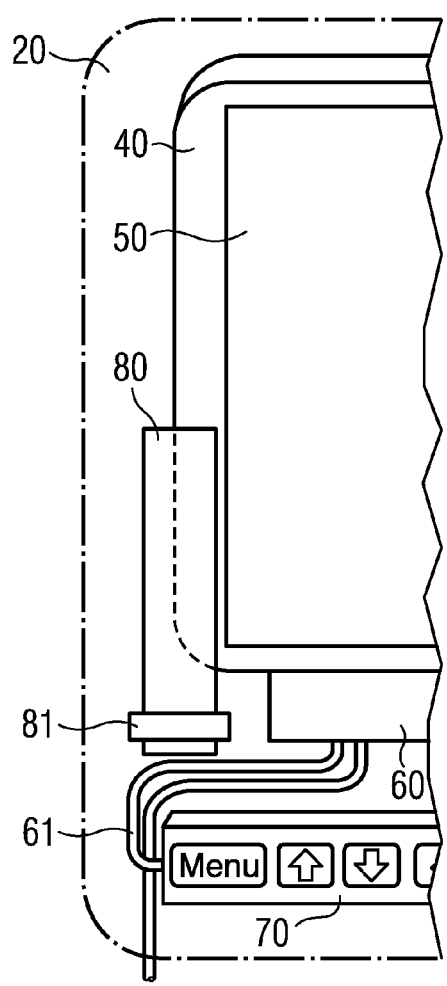

SEAT WITH UNIVERSAL DEVICE FOR RECEIVING AN ELECTRONIC GADGET FOR AN AIRCRAFT OR SPACECRAFT

CROSS-REFERENCES TO RELATED APPLICATIONS

This application is a continuation of and claims priority to International Patent Application No. PCT/EP2012/069197, filed Sep. 28, 2012, which claims the benefit of and priority to U.S. Provisional Application No. 61/540,273, filed Sep. 28, 2011 and German Patent Application No. 10 2011 083 622.5, filed Sep. 28, 2011, the entire disclosures of which are herein incorporated by reference.

TECHNICAL FIELD

The present invention relates to a seat device with a universal device for receiving an electronic gadget for an aircraft or spacecraft.

Although the present invention and the problem it addresses can be applied to any seat for an aircraft or spacecraft, they will be described with regard to an aircraft.

BACKGROUND

To entertain passengers during the long travel time of long-haul flights, so-called in-flight-entertainment systems (IFE systems) have been used for many years which provide every passenger in his/her seat with a choice of multimedia products, such as a plurality of films in different languages or music channels. The passenger usually watches the films on a screen which is fixedly installed as part of the IFE system in the region of the backrest.

However, IFE systems of this type require complex and cost-intensive certifications. For this reason, the IFE systems are not replaced during the entire period for which the seat is used, although systems of this type are under constant technical development.

From the prior art, DE 10 2006 007 284 A1 discloses an entertainment system for an aircraft in which, as an alternative to the known IFE system in the seat, information for the passenger is provided on a window pane of the aircraft. A disadvantage of this arrangement is that the presentation of films on the window pane can be distracting and disturbing in the long run for adjacent passengers.

SUMMARY

It is one idea of the present invention to provide a seat with an electronic gadget, for which a renewed complex certification during a subsequent replacement of the electronic gadget is unnecessary, and which is significantly more economical compared to known IFE systems.

According thereto, a seat with a receiving device for an electronic gadget is provided inside the headrest of the seat, the screen of the electronic gadget being separated in terms of construction from the surface of the seat by a safety screen.

The idea addressed by the present disclosure is to realise a structural uncoupling between the screen of the electronic gadget and the surface of the seat.

An advantage of the present invention is that due to the above-mentioned separation between the screen of the electronic gadget and the seat, it is possible to dispense with the complex and cost-intensive certification of the seat when the electronic gadget is exchanged so that just a single certification of this type is required for the seat according to the invention. With this certification, the electronic gadget can then be replaced by another specimen of a similar mass.

Thus, the present seat makes it possible for an airline to adapt an IFE system, obtained during the new acquisition of the aircraft, to the technical development of components of this type through exchange, the otherwise usual additional certification of the seat in respect of impact safety becoming unnecessary. At the same time, the safety screen ensures that the electronic gadget is inaccessible to passengers, thereby reliably preventing tampering with or theft of the electronic gadget.

Furthermore, the cost of integrating an IFE system is considerably reduced for the seat manufacturer by the use of a standardised receiving device, as a result of which the costs of providing a seat of this type can be reduced.

The exchangeability of the IFE system in the present seat means that the IFE system can be easily adapted to further developed subsequent models during the time the seat is used. This enhances the use and convenience for the passengers. Thus, the IFE system is formed in particular by the electronic gadget, and preferably by an electronic video device.

In addition thereto, the standardised receiving device in the seat provides an open market for IFE systems, so that consequently, a relatively large choice of IFE systems is available to the airlines at the time when the seats are acquired. Furthermore, the standardised size of the receiving device advantageously ensures that in spite of different dimensions, a single receiving device can be used in each case for an electronic gadget produced by different manufacturers.

Furthermore, the receiving device is configured to receive an electronic gadget in the form of a tablet PC or a PDA. The use of a tablet PC or of a PDA as the electronic gadget significantly reduces the acquisition costs thereof compared to a screen and to the components of a conventional IFE system, since tablet PCs and PDAs are products which are manufactured for the mass market and hence can be supplied cheaply. Furthermore, by now the screens of entertainment devices of this type are large enough to allow films to be presented thereon in an appropriately high resolution. Due to the continuous development and the fierce competition of electronic gadgets of this type, relatively short innovation cycles exist for these products, so that during the period of use of the aircraft seat, the passenger can benefit from the additional facilities of the relatively new electronic gadgets.

Advantageous configurations and improvements of the invention are provided in the subclaims.

According to a possible configuration, the seat has a headrest, the receiving device and the safety screen being arranged in the headrest. The arrangement of the receiving device and of the safety screen in the headrest of the seat advantageously makes it possible for the passenger to view the electronic gadget in the receiving device in a particularly convenient and ergonomically favourable manner, the passenger being able to view said gadget in a sitting position, substantially without any effort. Furthermore, the arrangement of the receiving device and thus of the electronic gadget inside the headrest ensures that said electronic gadget is inaccessible to the passenger.

According to a further possible configuration, the size and/or shape of the safety screen substantially corresponds to the size and/or shape of the receiving device and of the electronic gadget. A configuration of this type of the safety screen ensures the complete covering of the screen of the electronic gadget in the receiving device and the provision of the safety screen also maximises the secure surface during the impact of the passenger's head in the event of an accident.

According to a further possible configuration, the seat has an electric power supply or can be connected via a first interface to the electric power supply of the aircraft or spacecraft, and the receiving device has a second electrical interface for the electric energy supply of the electronic gadget. This means that the electronic gadget can be operated and/or charged continuously during the flight, even when the passenger is not using the gadget.

According to a further possible configuration, the receiving device has on at least one side an opening which is configured such that the electronic gadget can be inserted sideways into the receiving device via this opening. If allowed by the installation space inside the headrest, the electronic gadget can be exchanged through the opening in the side, the receiving device remaining installed in the seat while this takes place. Alternatively, the receiving device can also be removed from the headrest by means of an easily detachable connection, the receiving device then being opened and the electronic gadget being exchanged outside the seat.

According to a further possible configuration, the receiving device is configured such that the electronic gadget can be inserted from the front into the receiving device. The view from the front preferably emerges when the associated seat is viewed from the side on which the screen of the electronic gadget is arranged or, in an equivalent alternative thereto, this is the side which is opposite the side on which the screen of the electronic gadget is arranged. To exchange the electronic gadget, for example a cover is firstly removed which is arranged in the region of the headrest, and particularly in the contact region of the passenger with the headrest. The electronic gadget can then be removed from the front or frontally from the receiving device and the replacement gadget is then inserted into the receiving means in the same way.

According to a further possible configuration, the receiving device is articulated with the safety screen. This makes it possible to use the receiving device with the safety screen as an adapter for the electronic gadget. If different electronic gadgets are to be used, different adapters merely have to be produced, while the seats themselves can remain unchanged. In this respect, in a device, the safety screen can be articulated by its upper edge to the receiving device and in a further embodiment, it can be articulated by its left, right or lower edge to the receiving device. The safety screen protects the gadget and the display of the gadget during critical flight phases.

According to a further possible configuration, a retaining means is provided which is arranged in the seat and is configured to receive the receiving device and the safety screen, articulated thereto, particularly when the receiving device is closed. This makes it possible to easily install the adapter in the seat, said adapter being formed by the receiving device and the safety screen, and to exchange it, if necessary.

According to a further possible configuration, the seat has an operating unit which is provided for operating the electronic gadget. This makes it possible for the passenger to operate the electronic gadget by a standardised operating unit, so that the relevant functions of the electronic gadget can be selected with the smallest possible number of operating buttons.

According to a further possible configuration, the receiving device has a pivot device, the electronic gadget being accommodated in the pivot device such that the electronic gadget can be pivoted. This makes it possible for the passenger to adapt the viewing direction of the screen of the electronic gadget when the seat is inclined, so that the view of the screen can be optimally selected at all times.

According to a further possible configuration, the safety screen is arranged on the back of the seat, in particular on the back of the headrest. This arrangement advantageously allows the construction of the seat to be adapted in respect of the safety screen, which is also required, and in respect of the receiving device with very little effort, since the known IFE systems with the fixedly installed screen are also arranged in this region.

According to a further possible configuration, the safety screen consists of Plexiglas® or of a plastics material.

According to a further possible configuration, the safety screen is configured such that it will not shatter when subjected to an external influence. A configuration of this type of the safety screen advantageously ensures that it satisfies all safety-relevant requirements imposed in a component of this type, so that when the safety screen is subjected to an external influence, no splinters are produced. Accordingly, the safety screen can consist of a plurality of superimposed sheets which each have an interposed protective film to collect splinters.

According to a further possible configuration, the safety screen has a surface coating which makes the surface of the safety screen scratch-resistant. A surface coating of this type ensures that over the period of use of the seat, the passenger can always see a clear, unimpaired picture on the screen of the electronic gadget in spite of an external influence on the safety screen.

Furthermore, an aircraft or spacecraft having at least one seat according to the invention is claimed.

BRIEF DESCRIPTION OF THE DRAWINGS

In the following, the invention will be described in more detail on the basis of embodiments with reference to the accompanying figures of the drawings, in which:

FIG. 2 is a side view of the region of the headrest for a seat with a device for receiving an electronic gadget according to a second embodiment of the present invention;

FIG. 3 is a partial view from the front of the region of the headrest for the seat according to FIG. 2;

In the figures, identical reference numerals denote identical or functionally identical components, unless indicated otherwise.

DETAILED DESCRIPTION

Figure 1:
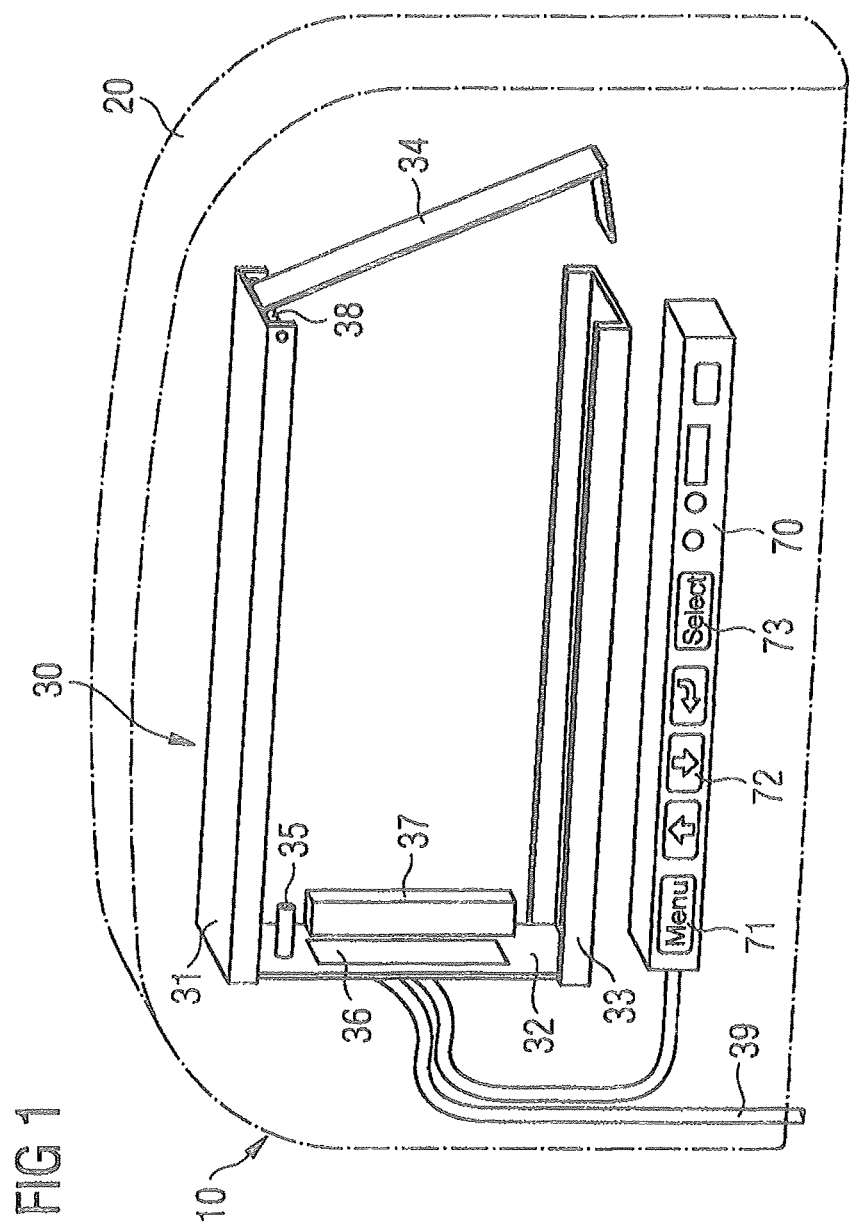
FIG. 1 is a perspective view of the region of the headrest for a seat with a device for receiving an electronic gadget according to a first embodiment of the present invention.

FIG. 1 is a perspective view of a region of a headrest 20 for a seat 10 with a device 30 for receiving an electronic gadget (not shown) according to a first embodiment of the present invention.

In its interior, the headrest 20 has the receiving device 30 which is coupled inside to a frame (not shown) of the seat 10. The receiving device 30 is arranged substantially centrally with regard to the thickness of the headrest 20. The receiving device 30 is arranged with regard to the height of the headrest 20 such that a screen for an electronic gadget (not shown) which is received by the receiving device 30 such that it can be exchanged, can be viewed comfortably by a passenger. The electronic gadget can be in particular an electronic video device.

Arranged in the region of the surface of the headrest 20, on the rearward side of the headrest 20 substantially congruently with the receiving device 30 is a safety screen (not shown), through which the screen of the electronic gadget can be viewed. The safety screen simultaneously ensures that the electronic gadget is inaccessible to the passenger, thereby reliably preventing tampering with, or theft of the electronic gadget.

The receiving device 30 is substantially rectangular in shape. The receiving device 30 comprises an upper rail 31 and a lower rail 33 which are each arranged in parallel at a distance from one another and have a u-shaped profile. The upper rail 31 and the lower rail 33 are joined together on one side by a connecting element 32 which has a plug 35, a socket 36 and an adapter 37, each of which extends towards the inside of the receiving device 30.

The plug 35 is arranged in such a manner and is used to ensure that the electronic gadget is not accidentally installed upside-down in the receiving device 30. Thus, the plug 35 can be arranged, for example, above the socket 36. The socket 36 is provided as an interface for the electricity supply and for the provision of control commands for the inserted electronic gadget, so that a continuous operation of the electronic gadget is also ensured on long-haul flights. The socket 36 is connected by a first cable 39 to an electric power supply (not shown) of the seat 10. The adapter 37 is preferably configured to form a stop for the electronic gadget in the installation position thereof. Thus, the adapter 37 can be cuboidal, for example.

Arranged opposite the connecting element 32 is a pivotable closing element 34 which is coupled by a pivot shaft 38 to a longitudinal end preferably of the upper rail 31. In the region of its free longitudinal end, the closing element 34 has a bent shape, the receiving device 30 being closed by this region and by the lower rail 33 via a closing mechanism (not shown). The electronic gadget is then exchanged by pivoting the closing element 34 to the side, thereby exposing an opening for removing the electronic gadget, so that the electronic gadget can be removed through this side opening and through which in turn the new electronic gadget can be inserted into the receiving device 30. Thereafter, the closing element 34 is again pivoted towards the receiving device 30 and the receiving device is closed.

Arranged under the receiving device 30 and in the region of the surface of the headrest 20 is an operating unit 70 which has a plurality of buttons 71, 72, 73. The buttons 71, 72, 73 allow the selection of predetermined functions for operating the electronic gadget, the operating unit 70 evaluating the pressing of buttons 71, 72, 73 and converting them into corresponding electrical control commands. The operating unit 70 is connected to the socket 36 by a second cable which transmits the control commands from the operating unit 70 to the electronic gadget.

With reference to FIGS. 2 and 3, a further embodiment is illustrated for a seat 10 with a device 80 for receiving an electronic gadget 40, where FIG. 2 shows a side view of the region of the headrest 20 and FIG. 3 shows a partial view from the front of the region of the headrest 20 for the seat 10 according to FIG. 2.

On its inside, the headrest 20 has a receiving device 80 which is coupled by a pivot device 81 with the frame (not shown) of the seat 10 such that the receiving device 80 can be pivoted. The pivot device 81 is preferably configured in the manner of a peg. The pivot device 81 is arranged in the region of the outer surface of the receiving device 80. The receiving device 80 has a mirror-symmetrical shape and consists of three u-shaped profiles which are arranged such that the inner faces thereof form a planar receiving surface for receiving an electronic gadget 40, said electronic gadget 40 being in contact with at least two different surfaces of one profile. When viewed from the front, i.e. when the seat associated with the receiving device 80 is viewed from the side on which the screen of the electronic gadget 40 is arranged, the receiving device 80 is substantially u-shaped. The receiving device 80 and the pivot device 81 are arranged at a distance from the centre of the headrest 20 towards the rearward part of the headrest 20 with regard to the thickness of the headrest 20.

Arranged in the region of the outer surface of the headrest 20 is a safety screen 50 which substantially has the size and shape of the receiving device 80 and covers a screen of the electronic gadget 40 which is accommodated in the receiving device 80. The safety screen 50 consists of Plexiglas® or of a transparent plastics material. The safety screen 50 has a thickness and construction such that when subjected to external influences, it satisfies all the safety requirements imposed on the safety screen 50, such as the requirement that the safety screen 50 must be shatterproof.

Arranged inside the headrest 20 is a plate-shaped head protector 90 which substantially extends over the entire width and the height of the headrest 20. The head protector 90 can be pivoted via a pivot axle 91 which is arranged in the region below the centre of the head protector 90 and is received and mounted by the frame of the seat 10.

Arranged below the receiving device 80 in the region of the outer surface of the headrest 20 is an operating unit 70 which is substantially identical to the operating unit of FIG. 1. The operating unit 70 is connected by a cable 61 to an interface 60 which inputs the control commands from the operating unit 70 into the electronic gadget 40. Furthermore, the interface 60 is connected to a further cable 61 which is connected to an electric power supply (not shown) of the seat 10.

In the region of its outer surface, the headrest 20 has a covering 100 which is arranged in the contact region between the passenger's head and the headrest 20. The covering 100 is covered by an antimacassar 110 which extends over the length of the covering 100 on the surface thereof. To exchange the electronic gadget 40, the antimacassar 110 and the covering 100 are removed from the headrest 20, an opening in the frontal direction being exposed. The head protector 90 is then pivoted away from the inside of the headrest 20 until the opening is exposed. Finally, the receiving device 80 is pivoted by the pivot device 81 towards the outside of the headrest 20 until the electronic gadget 40 can be removed frontally through the opening. The new electronic gadget 40 is then installed in reverse sequence.

Figure 4:
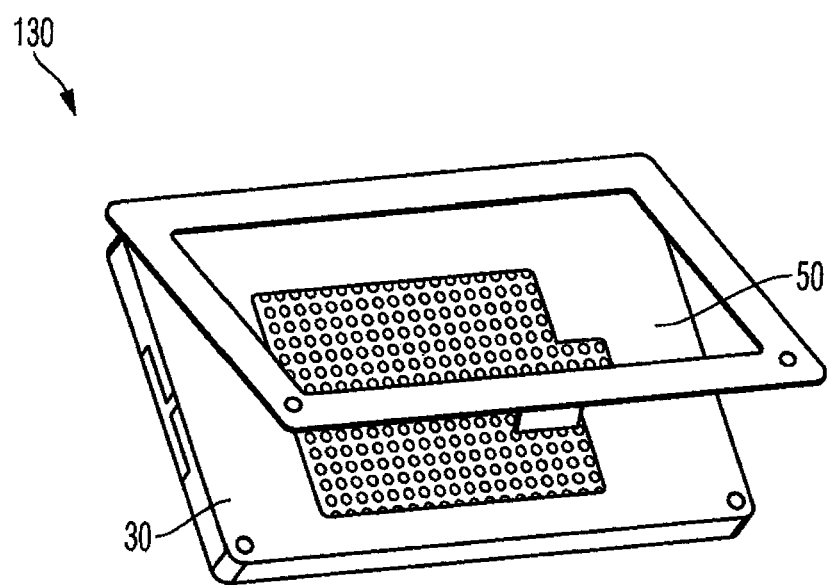
FIG. 4 is a view of an embodiment of the receiving device according to the invention which is articulated to the safety screen.

FIG. 4 shows a view of an embodiment of the receiving device 30 according to the invention which is articulated to the safety screen 50. The safety screen 50 is coupled to the receiving device 30, for example by a hinge 130. However, the safety screen 50 could also be coupled to the receiving device 30 by a coupler mechanism, for example a four-joint mechanism. In this manner, it is possible for the safety screen to perform a rotatory and translatory pivot movement relative to the receiving device 30 during opening and closing.

Figure 5:
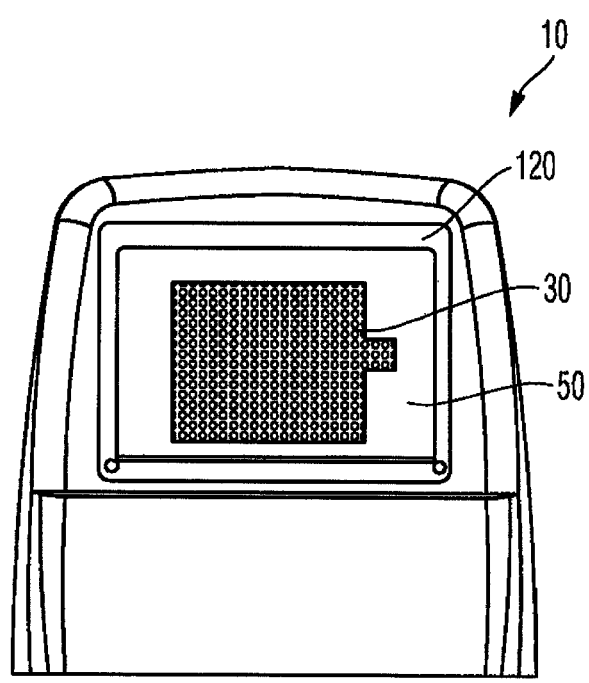
FIG. 5 is a schematic view of a seat with a retaining device according to an embodiment of the invention.

FIG. 5 is a schematic view of a seat 10 with a retaining device 120 according to an embodiment of the invention. The retaining device 120 is arranged on the back of the seat 10. In this embodiment, the retaining device 120 is in the form of a frame and is also configured to hold the receiving device 30 non-positively and/or positively. The retaining device 120 can also be provided with a catch device, for example a ball catch which catches into the receiving device 30. The receiving device 30 could also be secured in the retaining device 120 by suckers and/or by a Velcro® fastening.

Although the present invention has been described above on the basis of preferred embodiments, it is not restricted thereto, but can be modified in many different ways.

For example, the receiving device can have adapters for adapting the vertical installation site for the screen of the electronic gadget in the case of different sized screens of different electronic gadgets.

What is claimed is:

1. A seat for an aircraft or spacecraft comprising:
a headrest;
a receiving device integrated into said headrest, said receiving device comprising:
an upper rail spaced apart from and parallel to a lower rail, said upper rail and said lower rail on one end being joined by a connecting element, said receiving device further comprising a pivotable closing element provided on a second end of said upper rail and said lower rail, said pivotable closing element configured to be pivoted about an axis to a first position wherein an opening is formed on said second end of said upper rail and said lower rail and a second position wherein the pivotable closing element forms a closed side of the receiving device;
a safety screen;
said receiving device being configured to releasably receive sideways through said opening an electronic device fitted with a screen, said electronic device being one of a tablet personal computer (PC) or a PDA such that said screen is configured to be visible through said safety screen but inaccessible from an exterior of said seat.

2. The seat according to claim 1, wherein the size or shape of the safety screen generally corresponds to the size or shape of the receiving device and of the electronic device.

3. The seat according to claim 1, wherein the seat has an electric power supply or is connected to an electric power supply of the aircraft or spacecraft by a first interface, and the receiving device has a second electrical interface for the electrical energy supply of the electronic device.

4. The seat according to claim 1, wherein the receiving device is articulated to the safety screen.

5. The seat according to claim 4, wherein a retaining device is provided which is arranged in the seat and is configured to receive the receiving device and the safety screen articulated thereto.

6. The seat according to claim 1, wherein the seat has an operating unit which is provided to operate the electronic device.

7. The seat according to claim 1, wherein the receiving device has a pivot device, the electronic device being accommodated in the pivot device such that the electronic device is pivoted.

8. The seat according to claim 1, wherein the safety screen is arranged on the back of the seat.

9. The seat according to claim 1, wherein the safety screen consists of a plastics material.

10. The seat according to claim 1, wherein the safety screen is configured such that the safety screen does not shatter.

11. The seat according to claim 1, wherein the safety screen has a surface coating such that the surface of the safety screen is scratch-proof.

12. An aircraft or spacecraft, having at least one seat according to claim 1.

* * * * *